2,801,179

OXIDIZABLE COMPOSITIONS STABILIZED WITH 5-ACENAPHTHENOL

Clarence E. Tholstrup and Alan Bell, Kingsport, Tenn., assignors to Eastman Kodak Company, Rochester, N. Y., a corporation of New Jersey No Drawing. Application August 10, 1954, Serial No. 449,016

20 Claims. (Cl. 99—163)

This invention relates to compositions of matter comprising normally oxidizable organic material stabilized against the deleterious effects of oxidation with a new and improved antioxidant. The invention is particularly concerned with the stabilization of such materials as solid fats, fatty oils, hydrocarbons, petroleum derivatives, polymeric materials, vitamins, and similar oxidizable organic compositions by means of 5-acenaphthenol.

For many years, attempts have been made to overcome the deleterious effects of oxidation on organic materials which normally possess relatively low resistance to oxidation. A large number of antioxidants have been proposed and are widely used in stabilizing the various oxidizable materials. Because of the widespread use of compositions which need to be stabilized, the search for even more potent antioxidants is continuing.

It is accordingly an object of this invention to provide compositions consisting predominantly of normally oxidizable organic materials stabilized with an improved antioxidant effective to prevent the deleterious effects of oxidation for much longer periods of time than was possible with the antioxidants known heretofore and which can be used in much smaller amounts than was possible with conventional antioxidants.

Another object of the invention is to stabilize such normally oxidizable organic materials as the fatty materials, including both solid fats and fatty oils, oxidizable hydrocarbons, including the polymeric hydrocarbons, petroleum derivatives such as waxes, mineral oils, gasoline, lubricating oils, and the like, vitamins, citrus oils, and similar well known materials normally subject to oxidation.

Another object of the invention is to stabilize normally oxidizable organic materials by means of 5-acenaphthenol whereby improved stability is obtained over the stability resulting from the use of the conventional antioxidants known heretofore.

Other objects will be apparent from the description and claims which follow.

These and other objects are attained by means of this invention, which comprises stabilizing any of the normally oxidizable organic materials by incorporating therein at least 0.0001% by weight, based on the weight of material being stabilized, of 5-acenaphthenol having the formula

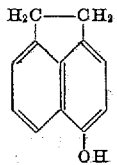

We have found that 5-acenaphthenol is more than twice as effective as the antioxidants normally employed heretofore for stabilizing any of the normally oxidizable organic materials. Because of its high activity, 5-acenaphthenol is effective at concentrations as low as 0.0001 to 0.002% by weight, whereas the conventional antioxidants are normally employed at concentrations of 0.01 to 0.02% by weight. When the antioxidant embodying this invention is used in such higher concentration ranges in accordance with usual practice, the compositions thereby obtained have stabilities of from twice to more than ten times the stability usually obtained with such well known antioxidants as butylated hydroxy anisole, butylated hydroxy toluene, or propyl gallate.

As has been indicated, 5-acenaphthenol is effective for stabilizing any of the well known normally oxidizable organic materials. Thus, for example, this stabilizer possesses a high degree of utility in stabilizing any of the well known fatty materials, including both the solid fats and the fatty oils. Thus, the fatty triglycerides, free fatty acids and fatty acid partial esters of the polyhydric alcohols such as the monoglycerides and diglycerides are readily stabilized in accordance with this invention. The fatty triglycerides which can be stabilized include the animal fats such as lard, tallow, and the like, as well as the fatty oils such as the vegetable oils, including such widely used vegetable oils as cottonseed oil, peanut oil, corn oil, soybean oil, cocoanut oil, and similar fatty oils. The 5-acenaphthenol is also effective for stabilizing industrial oils, waxes, hydrocarbons, vitamins, citrus oils, greases, as well as materials such as polyethylene, cellulose esters, polyesters, natural and synthetic rubbers, and similar materials subject to oxidation. The antioxidant of this invention finds particular utility in stabilizing petroleum derivatives such as waxes, mineral oil, gasoline, and other petroleum fractions. The high activity of the antioxidant makes its use in motor fuels and fuel oils particularly desirable, since it can be used in extremely low concentrations.

Although the compound 5-acenaphthenol has been known, it has not been employed heretofore as an antioxidant, and its utility for this purpose was not previously recognized. The 5-acenaphthenol is the most readily prepared of the isomeric forms and hence is the preferred antioxidant, although isomeric forms can be prepared and used somewhat less advantageously. The utility of the antioxidant of this invention as compared to other well known antioxidants is shown in Table 1. In Table 1, lard was employed as the substrate being stabilized, and the stability was evaluated by the accelerated Active Oxygen Method (AOM) wherein air is bubbled through the lard containing the antioxidant at a temperature of 98.8° C. and the oxidation is followed by a determination of the milliequivalents of peroxide formed per kilogram of substrate. Ordinarily, a Peroxide Value (PV) of 20 is the upper limit which can be tolerated in edible fats. Above this value, the fats exhibit an objectionable degree of rancidity. Thus in Table 1, the number of hours required to reach a Peroxide Value of 20 milliequivalents per kilogram are set out. The last column in the table headed Antioxidant Index shows the comparative activity of the antioxidants based on the activity of butylated hydroxy anisole as 1.

Table 1

| Antioxidant | Percent | Hrs. to PV 20 | Antioxidant Index |
|---|---|---|---|
| Control | 0 | 11 | |
| Butylated hydroxy anisole | 0.02 | 40 | 1.0 |
| Butylated hydroxy toluene | 0.02 | 52 | 1.4 |
| Propyl gallate | 0.02 | 93 | 2.8 |
| 5-Acenaphthenol | 0.02 | >300 | >11 |

As can be seen from Table 1, 5-acenaphthenol is more than 11 times as active as butylated hydroxy anisole and nearly 5 times as active as propyl gallate for stabilizing lard.

The stability results obtained by the AOM test represent a much longer period of stability under normal storage conditions. Consequently, it is usually not necessary to employ the 5-acenaphthenol in amounts as high as 0.02% by weight based on the weight of the material being stabilized. The results set out in Table 2 illustrate the degree of stability imparted to lard at varying concentrations of stabilizer.

*Table 2*

| Antioxidant | Percent | Hrs. to PV 20 (AOM) |
|---|---|---|
| Control | | 11 |
| 5-Acenaphthenol | 0.02 | >300 |
| Do | 0.0025 | 85.0 |
| Do | 0.0010 | 42.0 |
| Do | 0.0005 | 27.0 |

The antioxidant of this invention shows similarly increased activity when employed in stabilizing vegetable oils. Thus, in Table 3, the activity of this antioxidant is compared with other well known antioxidants for stabilizing cottonseed oil and peanut oil.

*Table 3*

| Antioxidant | Percent | Substrate | Hours (AOM) To Reach— | | |
|---|---|---|---|---|---|
| | | | PV 20 | PV 70 | PV 100 |
| None | | Cottonseed oil | 6.0 | 12.0 | 15.0 |
| Butylated hydroxy anisole | 0.02 | do | 6.5 | 14.0 | 16.0 |
| Butylated hydroxy toluene | 0.02 | do | 7.0 | 14.0 | 17.0 |
| Propyl gallate | 0.02 | do | 32.0 | 46.0 | 49.0 |
| 5-Acenaphthenol | 0.02 | do | 28.0 | 62.0 | 66.0 |
| None | | Peanut oil | 7.0 | 19.0 | 21.0 |
| Butylated hydroxy anisole | 0.02 | do | 6.0 | 19.0 | 21.0 |
| Butylated hydroxy toluene | 0.02 | do | 14.0 | 28.0 | 32.0 |
| Propyl gallate | 0.02 | do | 15.0 | 48.0 | 51.0 |
| 5-Acenaphthenol | 0.02 | do | 71.0 | 108.0 | 112.0 |

Similarly improved results are obtained using the antioxidant of this invention for stabilizing petroleum derivatives such as paraffin wax and mineral oil. In Table 4, the number of hours required to reach a Peroxide Value of 50 and 100 milliequivalents per kilogram of paraffin wax and mineral oil respectively are set out. In the AOM test used in obtaining the data set out in Table 4, a temperature of 150° C. was employed.

*Table 4*

| Antioxidant | Percent | AOM Keeping Quality In Hours | | | |
|---|---|---|---|---|---|
| | | Paraffin Wax | | Mineral Oil | |
| | | 50 meq. | 100 meq. | 50 meq. | 100 meq. |
| Control | | 1.7 | 2.5 | 0.5 | 1.0 |
| Butylated hydroxy anisole | 0.01 | | | 6.0 | 7.0 |
| | 0.02 | 18.0 | 19.0 | | |
| Butylated hydroxy toluene | 0.01 | | | 6.0 | 7.0 |
| | 0.02 | 24.0 | 25.0 | | |
| 5-Acenaphthenol | 0.01 | | | 41.5 | 42.0 |
| | 0.02 | 55.0 | 57.0 | | |

An unusual and highly advantageous property of 5-acenaphthenol is that it not only possesses exceptional activity as an antioxidant but combines with this an unusual "carry through" of activity during cooking. Prior to this invention, butylated hydroxy anisole was considered to be unique in this carry through characteristic and was widely used in stabilization of fried foods such as potato chips, pastries, crackers, and other fat-containing foods. Usually, butylated hydroxy anisole was employed in combination with another more active antioxidant of poor carry through, such as propyl gallate, in order to get stability in cooking fats both before and after cooking.

In contrast to this, the single material, 5-acenaphthenol, has an initail activity which is much better than that of butylated hydroxy anisole and which is equal to or higher than that of propyl gallate, and, in addition, has a carry through activity equal to that of butylated hydroxy anisole.

This combination of properties makes 5-acenaphthenol the most effective single stabilizer for cooking fats now known, and makes the use of antioxidant combinations unnecessary. The 5-acenaphthenol can be added to the fat to be used for cooking when the fat is prepared initially, and it will protect the fat against rancidity before use and will prevent rancidity in the cooked foods as well. This is of great value in the preparation of all fat-containing foods and is of particular utility with such foods as pastries, crackers, potato chips, fried nuts and the like.

The initial activity and carry through characteristics of the antioxidant of this invention is clearly shown in Table 5 in which lard was used as the fat.

*Table 5*

| Antioxidant (wt. percent) | AOM Hrs. to PV 20 Before Frying | Schaal Oven Data (Days) | | |
|---|---|---|---|---|
| | | Potato Chips | Pastry | Crackers |
| Control | 7.0 | 4 | 2 | 2 |
| 0.01% butylated hydroxy anisole | 27.0 | 34 | 36 | 23 |
| 0.01% 5-acenaphthenol | 198.0 | 31 | 36 | 24 |

As can be seen from Table 5, 5-acenaphthenol is more than seven times as effective as butylated hydroxy anisole in stabilizing fats prior to cooking and possesses a carry through activity equal to butylated hydroxy anisole which was hitherto noted for its unusual carry through characteristics.

Similarly improved results are obtained by incorporating 5-acenaphthenol in any of the other normally oxidizable materials which require an antioxidant during use. Thus, by means of this invention, compositions of greatly improved stability against oxidation are readily obtained. The antioxidant 5-acenaphthenol makes the preparation of highly stable compositions possible, and the antioxidant can be used in much lower concentrations than was possible with the antioxidants employed heretofore. As with other antioxidants, the 5-acenaphthenol can be employed alone as shown in the data set out in the tables, or it can be employed in combination with one or more other stabilizers such as are well known in the art, including the phenolic stabilizers, as well as the stabilizing acids such as citric acid, tartaric acid, ascorbic acid, and the like, as well as the esters of organic acids and other well known stabilizing materials.

The invention has been described in considerable detail with particular reference to certain preferred embodiments thereof, but it will be understood that variations and modifications can be employed within the spirit and scope of the invention as described hereinabove and as defined in the appended claims.

We claim:

1. A composition of matter comprising a normally oxidizable organic material stabilized with a compound of the formula

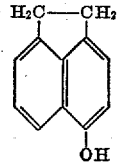

2. A composition of matter comprising a fatty material stabilized with a compound of the formula

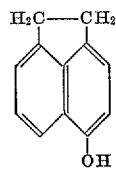

3. A composition of matter comprising a hydrocarbon normally subject to oxidation stabilized with a compound of the formula

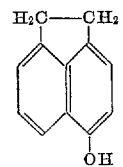

4. A composition of matter comprising fatty triglyceride stabilized with a compound of the formula

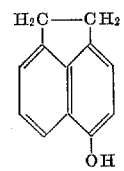

5. A composition of matter comprising a petroleum hydrocarbon stabilized with a compound of the formula

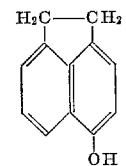

6. A composition of matter comprising an oil normally subject to oxidation stabilized with a compound of the formula

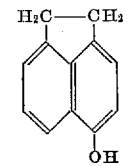

7. A composition of matter comprising a wax normally subject to oxidation stabilized with a compound of the formula

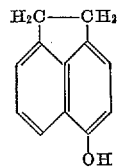

8. Lard stabilized with at least 0.0001% by weight of 5-acenaphthenol.

9. Vegetable oil stabilized with at least 0.0001% by weight of 5-acenaphthenol.

10. Mineral oil stabilized with at least 0.0001% by weight of 5-acenaphthenol.

11. Wax stabilized with at least 0.0001% by weight of 5-acenaphthenol.

12. The method which comprises stabilizing organic material normally subject to oxidative deterioration by incorporating therein at least 0.0001% by weight of 5-acenaphthenol.

13. The method which comprises stabilizing fatty material by incorporating therein at least 0.0001% by weight of 5-acenaphthenol.

14. The method which comprises stabilizing a hydrocarbon normally subject to oxidative deterioration by incorporating therein at least 0.0001% by weight of 5-acenaphthenol.

15. The method which comprises stabilizing fatty triglyceride by incorporating therein at least 0.0001% by weight of 5-acenaphthenol.

16. The method which comprises stabilizing a petroleum hydrocarbon against oxidative deterioration by incorporating therein at least 0.0001% by weight of 5-acenaphthenol.

17. A fat-containing food stabilized with 5-acenaphthenol.

18. The method of stabilizing fat-containing food against objectionable rancidity which comprises incorporating 5-acenaphthenol in a cooking fat prior to cooking, and employing the stabilized cooking fat in cooking said fat-containing food.

19. Fried food stabilized with 5-acenaphthenol.

20. Pastry stabilized with 5-acenaphthenol.

References Cited in the file of this patent
UNITED STATES PATENTS

| | | |
|---|---|---|
| 1,884,885 | Sebrell et al. | Oct. 25, 1932 |
| 2,116,220 | Shoemaker | May 3, 1938 |